(12) United States Patent
Bursell et al.

(10) Patent No.: US 12,361,118 B2
(45) Date of Patent: *Jul. 15, 2025

(54) EFFICIENT LAUNCHING OF TRUSTED EXECUTION ENVIRONMENTS

(71) Applicant: Red Hat, Inc., Raleigh, NC (US)

(72) Inventors: Michael Hingston McLaughlin Bursell, Farnborough (GB); Michael Tsirkin, Yokneam Illit (IL); Nathaniel McCallum, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 282 days.

This patent is subject to a terminal disclaimer.

(21) Appl. No.: 18/072,330

(22) Filed: Nov. 30, 2022

(65) Prior Publication Data

US 2023/0106455 A1    Apr. 6, 2023

Related U.S. Application Data

(63) Continuation-in-part of application No. 17/107,416, filed on Nov. 30, 2020, now Pat. No. 11,847,253.

(51) Int. Cl.
*G06F 21/53* (2013.01)
*G06F 21/60* (2013.01)

(52) U.S. Cl.
CPC ............ *G06F 21/53* (2013.01); *G06F 21/602* (2013.01)

(58) Field of Classification Search
CPC .......... G06F 21/32; G06F 3/013; G06F 3/017; G06F 3/011; G06F 1/163; G06F 3/005;

(Continued)

(56) References Cited

U.S. PATENT DOCUMENTS 9,674,182 B2 * 6/2017 Smith .................... G06F 21/51
10,091,241 B2 * 10/2018 Keyser ................. H04L 63/062
(Continued)

OTHER PUBLICATIONS

Advanced Micro Devices, Inc., "Secure Encrypted Virtualization API", Feb. 2018, 99 pages http://developer.amd.com/wordpress/media/2017/11/55766_SEV-KM-API_Specification.pdf.

(Continued)

*Primary Examiner* — Sharif E Ullah
(74) *Attorney, Agent, or Firm* — Dority & Manning, P.A.

(57) ABSTRACT

The technology disclosed herein enables efficient launching of trusted execution environments. An example method can include: receiving, by a processing device of a first computing device, a first request from a second computing device to establish a first trusted execution environment (TEE) in the first computing device; establishing the first TEE in the first computing device, wherein the first TEE comprises an encrypted memory area and executable code; receiving, by the processing device, a second request to establish a second TEE in the first computing device; establishing, by the first TEE, the second TEE in the first computing device, wherein the second TEE comprises a second executable code; receiving, by the first TEE, cryptographic key data from the second computing device; validating, by the first TEE, the second TEE; providing, by the first TEE, the cryptographic key data to the second TEE; and causing, by the processing device, the second TEE to execute, using the cryptographic key data, the second executable code.

20 Claims, 8 Drawing Sheets

(58) Field of Classification Search
CPC ........ G06F 3/0488; G06F 21/34; G06F 3/016; G06F 21/45; G06F 21/53; H04L 63/0861; H04L 9/3231; H04L 63/08; H04L 63/102; H04W 12/06; H04W 12/65; H04W 4/02; G06V 40/166
USPC ........ 713/150, 163, 181, 189; 726/2, 21, 36; 380/255, 264, 276
See application file for complete search history.

(56) References Cited

U.S. PATENT DOCUMENTS

| | | | | |
|---|---|---|---|---|
| 10,200,367 | B2* | 2/2019 | Chastain | H04W 12/35 |
| 10,389,709 | B2* | 8/2019 | Potlapally | H04L 63/12 |
| 10,621,350 | B2* | 4/2020 | Novak | H04L 63/0823 |
| 11,599,368 | B2* | 3/2023 | Bartfai-Walcott | G06F 9/44505 |
| 2015/0244716 | A1* | 8/2015 | Potlapally | H04L 63/0853 713/155 |
| 2016/0105430 | A1* | 4/2016 | Smith | H04L 63/20 726/4 |
| 2016/0350534 | A1* | 12/2016 | Poornachandran | G06F 21/554 |
| 2018/0048643 | A1* | 2/2018 | Sharaga | H04L 63/0892 |
| 2018/0234403 | A1* | 8/2018 | Casella | H04L 9/14 |
| 2019/0042759 | A1* | 2/2019 | Smith | G06F 21/602 |
| 2019/0095879 | A1* | 3/2019 | Eyal | G06Q 20/223 |
| 2019/0102555 | A1* | 4/2019 | Novak | H04L 9/3268 |
| 2019/0155728 | A1* | 5/2019 | Ferguson | H04L 63/062 |
| 2020/0202038 | A1* | 6/2020 | Zhang | G16B 30/10 |
| 2023/0015537 | A1* | 1/2023 | Vahldiek-Oberwagner | H04L 9/3236 |
| 2023/0034725 | A1* | 2/2023 | Bursell | H04L 63/1433 |

OTHER PUBLICATIONS

Buhren et al., "Insecure Until Proven Updated: Analyzing AMD SEV's Remote Attestation", Technical University Berlin Security in Telecommunications; Hasso Plattner Institute, Potsdam, Sep. 2, 2019, 13 pages https://arxiv.org/pdf/1908.11680.pdf.

Alder, N. et al., "S-Faas: Trustworthy and Accountalbe Funicition-as-a-Service using Intel SGX", Aalto University, Intel Labs, Oct. 14, 2018, 18 pages, http://arxiv.org/pdf/1810.06080.pdf.

Zhao, S. et al., "SecTEE: A Software-based Approach to Secure Enclave Architecture Using TEE", Institue of Computer Chinese, Academy of Aciences, Beijing, China, College of Information Engineering Captial Normal University Beijing China, Nov. 11-15, 2019, 18 pages, https://dl.acm.org/doi/10.1145/3319535.363205.

Jang, J. et al., "SeCReT: Secure Channel between Rich Execution Environment and Trusted Execution Environment", Graduate School of Information Security, Korea Advanced Institute of Science and Technology, Feb. 8-11, 2015, 15 pages, http://pdfs.semanticscholar.org/7b14/f087dc728305fc5be293086f6c20874ec0b.pdf.

* cited by examiner

EFFICIENT LAUNCHING OF TRUSTED EXECUTION ENVIRONMENTS

RELATED APPLICATIONS

The present application is a continuation-in-part of application Ser. No. 17/107,416, filed Nov. 30, 2020, entitled "Efficient Launching of Trusted Execution Environments," which is incorporated by reference herein in its entirety.

TECHNICAL FIELD

The present disclosure generally relates to computer systems, and more particularly, to efficient launching of trusted execution environments in computer systems.

BACKGROUND

A trusted execution environment (TEE) is a secure area of a main processor that can guarantee code and data loaded inside to be protected with respect to confidentiality and integrity. A TEE as an isolated execution environment can provide security features such as isolated execution, integrity of applications executing with the TEE, along with confidentiality of stored data. A TEE can provide an execution space with a higher level of security for trusted applications that run on computing devices that are not trusted by the application owner.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
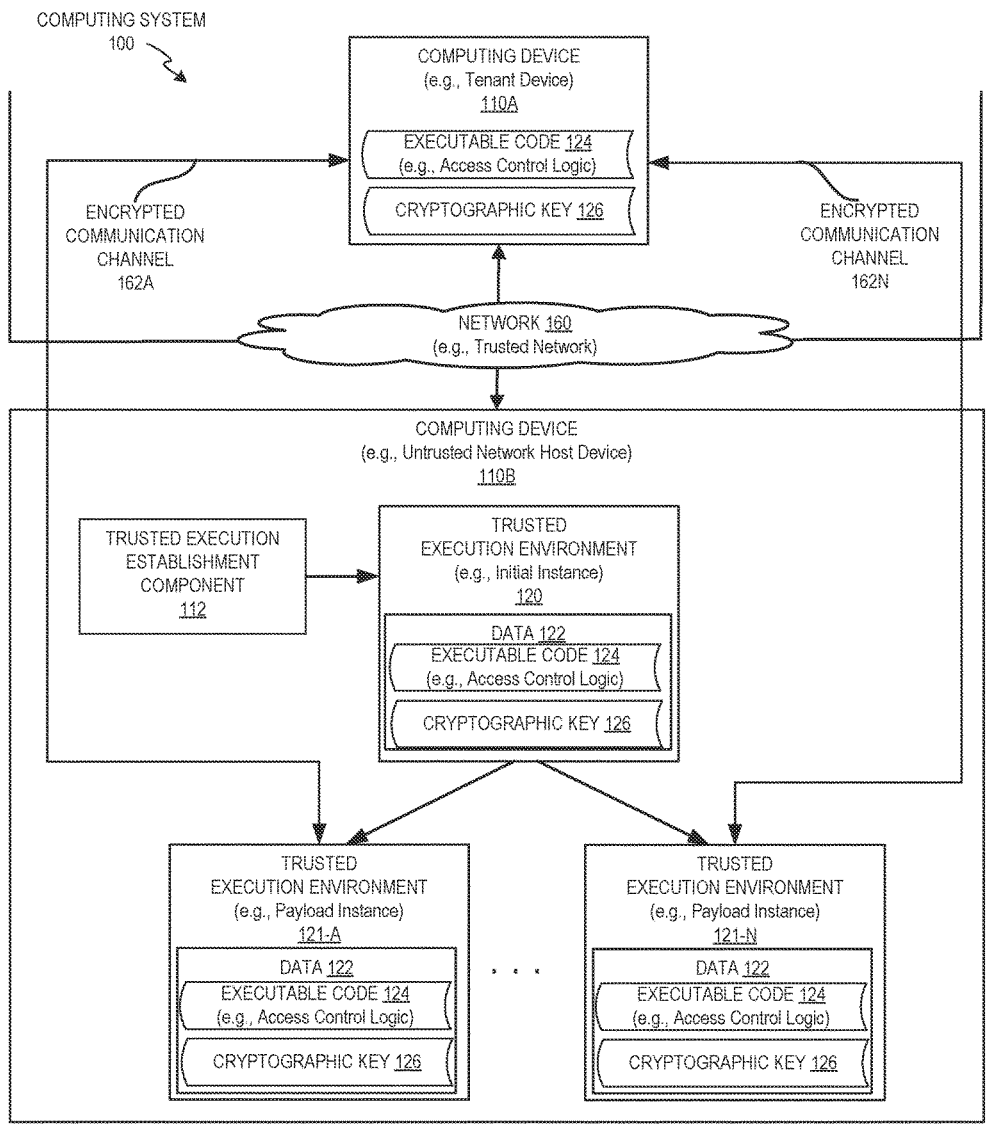
FIG. 1 depicts a high-level block diagram of an example computing environment that facilitates efficient launching of trusted execution environments, in accordance with one or more aspects of the present disclosure.

Described herein are methods and systems for efficient launching of trusted execution environments in computer systems. Trusted Execution Environments (TEEs) can encrypt memory pages and subsequently only decrypt them when they are being processed in the CPU of an untrusted host. TEEs can allow tenants of untrusted computing environments to deploy applications securely in those environments. In such instances, TEEs can provide the ability to enable private computing in cloud computing environments and Internet of Things (IoT) implementations where the computing devices to which applications are to be deployed are untrusted and/or insecure. TEEs, however, present several technological challenges. In some instances, TEE implementations can involve increases in deployment latency, since each TEE launched by a tenant involves validation of the TEE by the tenant. When the tenant is operating from a device outside the untrusted host network, this can present significant performance delays as a result of communication between the trusted network and untrusted network since the validation steps between the tenant and host should be performed for each TEE to be launched. Additionally, TEEs are often implemented by some systems by utilizing platform specific methods of validation (e.g., measurement and attestation). This result in significant inefficiencies in cross platform application deployment since a TEE implementation may need to be modified for each platform to which it is deployed, which can result in increases in both complexity and resource requirements.

Aspects of the present disclosure address the above and other deficiencies by implementing technology to facilitate efficient launching of trusted execution environments. In particular, a trusted execution establishment component can receive a request from a tenant device to establish an initial instance TEE of a set of multiple TEEs in an untrusted host computing device. The trusted execution establishment component can configure the initial instance TEE based on the request and validate that initial instance with the tenant. Notably, attestation of the initial instance would not include a platform specific encryption key. The tenant could subsequently provide to the initial instance TEE cryptographic key data that is not associated with the hardware/platform capabilities of the destination host that can be provided. The initial instance TEE could then configure additional payload instance TEEs that include different executable codes and cryptographic key data provided by the initial instance TEE in response to receiving a subsequent request to establish one or more additional payload instance TEEs. The initial instance TEE can configure, validate (e.g., performing measure and attestation operations), and launch the payload instance TEEs without direct involvement of the tenant. Each payload instance TEE can then execute its executable code using the provided cryptographic key data.

Aspects of the present disclosure present advantages to the issues noted above. First, utilizing an initial instance of a TEE to perform the configuration, attestation, and launching of additional TEEs for the same tenant can significantly reduce latency in launching multiple TEE instances. Since the initial instance can configure and launch the additional TEEs without the involvement of the tenant, network traffic and processing resources can be significantly reduced since network communication between the tenant device and the untrusted host can be effectively eliminated for the additional TEE instances. Additionally, since the tenant is not involved in launching the additional instances, the efficiency of the overall launch process is significantly improved if the tenant loses communication with the untrusted host. The process can continue, and the additional TEEs can be launched even though the tenant has lost connectivity. Moreover, by utilizing cryptographic key data provided by the tenant rather than relying on hardware/vendor specific functionality, each TEE can be deployed in various untrusted environments without additional configuration and/or software modifications. This, in turn, can significantly improve efficiency and decrease resource requirements involved in deployment. In addition, instead of establishing a dedicated secure communication channel between the tenant and each additional TEE through which each additional TEE can receive cryptographic key data, the initial instance TEE can provide the cryptographic key data directly to each additional TEE without the need for the tenant. Thus, each additional TEE can simply start execution using the provided cryptographic key data. This can simplify communication among each of the TEES by decreasing the amount of resources and configuration required for establishing connection between the tenant and the additional TEEs, thus improving efficiency. Further, by only establishing an initial instance of the TEE at first and then later establishing additional TEEs in response to requests to establish the additional TEEs, there can be more flexibility by being able to dynamically adjust and modify payload instances instead of having to establish multiple TEEs at the beginning of a launch.

FIG. 1 depicts an illustrative architecture of elements of a computing environment 100, in accordance with an example of the present disclosure. It should be noted that other architectures for computing environment 100 are possible, and that the implementation of a computing environment utilizing embodiments of the disclosure are not necessarily limited to the specific architecture depicted. In the example shown in FIG. 1, computing environment 100 may include a tenant computing devices 110A and one or more of untrusted network host computing devices 110B that are capable of supporting trusted execution environments.

Computing devices 110A-B may include any computing devices that are capable of storing or accessing data and may include one or more servers, workstations, desktop computers, laptop computers, tablet computers, mobile phones, palm-sized computing devices, personal digital assistants (PDAs), smart watches, robotic devices (e.g., drones, autonomous vehicles), data storage device (e.g., USB drive), other device, or a combination thereof. Computing devices 110A-B may include one or more hardware processors based on x86, PowerPC®, SPARC®, ARM®, other hardware, or a combination thereof.

Computing device 110A may be referred to as a tenant computing device. Computing device 110A may be a device utilized by a tenant and may store executable code 124 and cryptographic key data 126 that can be used by deployed TEEs.

Executable code 124 may be loaded into trusted execution environments 120, 121A-N and may control how computing device 110B interacts with protected content. Executable code 124 may include executable data, configuration data, other data, or a combination thereof and may be stored and executed in the trusted execution environment 120. Executable code 124 may be stored in any format and may include one or more file system objects (e.g., files, directories, links), database objects (e.g., records, tables, field value pairs, tuples), other storage objects, or a combination thereof. Executable code 124 may implement logic for controlling the distribution, retrieval, or use of protected content.

Executable code 124 may use one or more cryptographic keys 126 to restrict access to protected content. Cryptographic key 126 may include cryptographic key data with one or more cryptographic bit sequences or other cryptographic keying material for storing, generating, or deriving a set of one or more cryptographic keys. Cryptographic key data may be represented in a human readable form (e.g., passcode, password), a non-human readable form (e.g., digital token, digital signature, or digital certificate), other form, or a combination thereof. Cryptographic key data may be input for a cryptographic function, output of a cryptographic function, or a combination thereof. Cryptographic key data may include one or more encryption keys, decryption keys, session keys, transport keys, migration keys, authentication keys, authorization keys, integrity keys, verification keys, digital tokens, license keys, certificates, signatures, hashes, other data or data structure, or a combination thereof. The cryptographic key data may include any number of cryptographic keys and may be used as part of a cryptographic system that provides privacy, integrity, authentication, authorization, non-repudiation, other features, or a combination thereof.

Computing device 110B may include a trusted execution establishment component 112 that enables computing device 110A to establish one or more trusted execution environments 120, 121A-N on computing device 110B. In various implementations, trusted execution establishment component 112 can receive a request from tenant computing device 110A to establish an initial instance of a trusted execution environment and/or additional instances of trusted execution environments of a set of trusted execution environments in computing device 110B. The request can specify that each TEE is to utilize executable code 124 and cryptographic key 126 provided by tenant computing device 110A. Trusted execution establishment component 112 can establish an initial instance TEE (e.g., TEE 120) that can facilitate the configuration and launch of the additional payload TEE instances (e.g., TEEs 121A-N) without direct involvement of the tenant.

Trusted execution establishment component 112 can authenticate TEE 120 and receive the cryptographic key 126 that is loaded into TEE with a copy of the executable code 124. Subsequently, TEE 120 can act as an agent for the tenant device by configuring, authenticating (e.g., validating), and launching TEEs 121A-N with the same and/or different executable code and cryptographic key data that was provided to TEE 120. Once each of TEEs 121A-N have launched, they can execute their respective executable code using the cryptographic key 126 stored in each TEE 121A-N provided by TEE 120. Trusted execution establishment component 112 is described in further detail below with respect to FIG. 5.

Trusted execution environments 120 and 121A-N may use encryption to isolate the data of a process (e.g., user space process, VM, container) from other processes running on the same computing device. In one example, the data of a process executing in the trusted execution environment may be encrypted using cryptographic keys provided by the tenant that are accessible to a hardware processor of the computing device but are inaccessible to all the processes running on the computing device (e.g., hardware level encryption). The hardware processor may encrypt or decrypt the data of the process executing in the trusted execution environment when the process stores or accesses the data. This enables the trusted execution environment to isolate data of a lower privileged process (e.g., application process or virtual machine process) executing within the trusted execution environment from being accessed by a higher privileged processes (e.g., kernel or hypervisor) even though the higher privileged processes may be responsible for managing the lower privileged process. Trusted execution environment may provide code execution, storage confidentiality, and integrity protection, and may store, execute, and isolate protected content from other processes executing on the same computing device, as discussed in more detail in regards to FIG. 2.

Trusted execution environments 120, 121A-N may be ephemeral execution environments that comprise non-persistent storage of computing device 110B and may or may not persistently store data on a persistent storage device (not pictured). The non-persistent storage may include data storage devices that lose data in response to an interruption and may include volatile memory (e.g., main memory), processor registers (e.g., CPU or GPU registers), other non-persistent cache, or a combination thereof. A persistent storage device may be internal to computing device 110B and accessible over a device bus or may be external to computing device 110B and accessible over a network connection (e.g., communication channel).

Network 160 may include one or more public networks (e.g., the internet), private networks (e.g., a local area network (LAN) or wide area network (WAN)), or a combination thereof. Network 160 may include a wired or a wireless infrastructure, which may be provided by one or more wireless communications systems, such as a wireless fidelity (WiFi) hotspot connected with the networks 160 and/or a wireless carrier system that can be implemented using various data processing equipment, communication towers, etc. In one example, network 160A may include one or more trusted networks. A trusted network may include security enhanced features that restrict access and use of network 160 to particular users and devices of an organization (e.g., intranet of a business entity). An untrusted network (e.g., intranet) may not provide the same level of security enhanced features as the trusted network and may be available for public access and use.

Communication channels 162A-N may include any communication channel that is capable of communicating data between computing devices and may include one or more connections. The connections may be network connections, computer-to-computer connections, peripheral connection, other connections, or a combination thereof. The network connections may be over the same network or different networks and each of the network connections may be an indirect connection that traverses one or more network nodes (e.g., access points, switches, routers, or other networking infrastructure device) and may communicably couple one of computing devices with one or more other computing devices. A computer-to-computer connection may be the same or similar to a peer-to-peer connection and may be a direct connection between computing devices (e.g., bluetooth connection, WiFi Direct, ad-hoc network connection). A peripheral connection may be a connection that uses a direct physical connection between an adapter of the computer and an adapter of the portable data storage device (e.g., Universal Serial Bus (USB) connection). The peripheral connection may exist when one of the computing devices is a computer and the other is a portable data storage device (e.g., USB drive, key fob, secure card).

Figure 2:
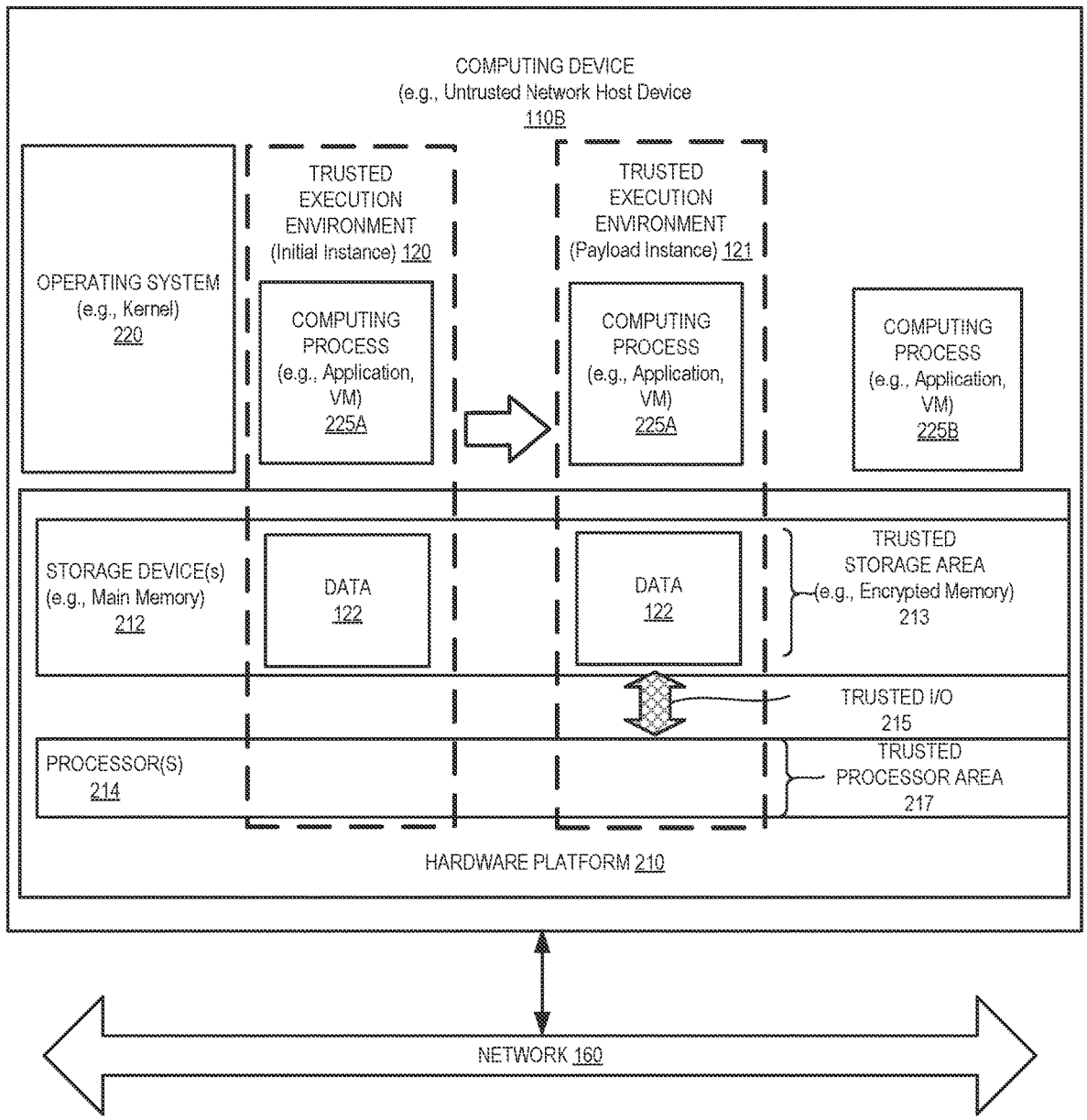
FIG. 2 depicts a block diagram of an example computing device that includes an initial instance of a trusted execution environment that can establish a payload trusted execution environment, in accordance with one or more aspects of the present disclosure.

FIG. 2 depicts an example of a set of trusted execution environments established in computing device 110B, in accordance with an embodiment of the present disclosure. Computing device 110B may be the same or similar to one or more of computing devices 110A-B of FIG. 1 and may include a hardware platform 210, a trusted execution environment 120, an operating system 220, one or more computing processes 225A-B, and a network 160. It should be noted that other architectures for computing device 110B are possible, and that the implementations of the computing device utilizing embodiments of the disclosure are not necessarily limited to the specific architecture depicted.

Hardware platform 210 may include one or more hardware devices that perform computing tasks for computing device 110B. Hardware platform 210 may include one or more data storage devices, computer processors, Basic Input Output services (BIOS), code (e.g., firmware), other aspects, or a combination thereof. One or more devices of the hardware platform 210 may be combined or consolidated into one or more physical devices or may partially or completely emulated as a virtual device or virtual machine. Hardware platform 210 may include one or more storage devices 212 and processors 214.

Storage devices 212 may include any data storage device that is capable of storing data and may include physical memory devices. The physical memory devices may include volatile memory devices (e.g., RAM, DRAM, SRAM), non-volatile memory devices (e.g., NVRAM), other types of memory devices, or a combination thereof. Storage devices 212 may also or alternatively include mass storage devices, such as hard drives (e.g., Hard Disk Drives (HDD)), solid-state storage (e.g., Solid State Drives (SSD)), other persistent data storage, or a combination thereof. Storage devices 212 may be capable of storing data 122 associated with one or more of the computing processes 225A-B. In one example, data of computing process 225A may be received from a device that is internal or external to computing device 110B. The data may be encrypted using a cryptographic key that was provided (e.g., determined, derived, generated, assigned) by computing device 110B or by a different computing device. The received data may be decrypted using the same cryptographic key or a derivative of the cryptographic key and the decrypted data may be loaded into the trusted execution environment 120 (as shown by data 122) before, during or after being re-encrypted.

Processors 214 may be communicably coupled to storage devices 212 and be capable of executing instructions encoding arithmetic, logical, or I/O operations. Processors 214 may include one or more general processors, Central Processing Units (CPUs), Graphical Processing Units (GPUs), Application Specific Integrated Circuits (ASICs), secure cryptoprocessors, Secure Elements (SE), Hardware Security Module (HSM), other processing unit, or a combination thereof. Processors 214 may be a single core processor, which may be capable of executing one instruction at a time (e.g., single pipeline of instructions) or a multi-core processor, which may simultaneously execute multiple instructions. Processors 214 may interact with storage devices 212 and provide one or more features defined by or offered by trusted systems, trusted computing, trusted computing base (TCB), trusted platform module (TPM), hardware security module (HSM), secure element (SE), other features, or a combination thereof.

Processors 214 may establish a trusted execution environment across multiple hardware devices of hardware platform 210 (e.g., processor and storage devices) and may include instructions (e.g., opcodes) to initiate, configure, and maintain the trusted execution environment 120. In one example, a trusted execution environment may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), TrustZone® provided by ARM®, IBM PEF, RISC-V Sanctum, other technology, or a combination thereof.

Trusted execution environments 120, 121 may be a security enhanced area in computing device 110B that may guard the data of a computing process from being accessed by other computing processes on computing device 110B. A trusted execution environment may enhance security by enhancing confidentiality (e.g., reducing unauthorized access), integrity (e.g., reduce unauthorized modifications), availability (e.g., enable authorized access), non-repudiation (e.g., action association), other aspect of digital security or data security, or a combination thereof. Trusted execution environment 120 may be the same or similar to a trust domain, trust zone, other term, or a combination hereof. Trusted execution environment 120 may protect data 122 while data 122 is in use (e.g., processed by processor 214), is in motion (e.g., transmitted over network 160), is at rest (e.g., stored in storage device 212), or a combinational thereof. Trusted execution environments 120, 121 may be a set of one or more trusted execution environments and each of the trusted execution environments may be referred to as an instance of a trusted execution environment (i.e., TEEi). Each trusted execution environment 120 may isolate data of at least one process executed in trusted execution environment 120 from processes executing external to the trusted execution environment. The at least one process may be a set of one or more processes associated with an execution construct being guarded by the trusted execution environment 120.

The execution construct may be a virtual machine, container, computing process, thread, instruction stream, or a combination thereof. In one example, trusted execution environment 120, 121 may execute a particular virtual machine (e.g. VM based TEE) and may guard data of the virtual machine from a hypervisor managing the virtual machine. In this example, computing device 110B may execute executable code in trusted execution environment 120, 121 as a virtual machine process and the executable code in the trusted execution environment may be accessible to the virtual machine process and inaccessible to a hypervisor managing the virtual machine process. As such, the trusted execution environment 120 of computing device may host a virtual machine that executes the executable data and all the data in the trusted execution environment may be accessible to the virtual machine and inaccessible to a hypervisor managing the virtual machine.

In another example, trusted execution environment 120, 121 may be associated with a particular computing process (e.g., process based TEE) and may guard data of the particular computing process from being access by other equally privileged, higher privileged, or lower privileged computing processes (e.g., guard application process against higher privileged Operating System (OS) process). In this example, computing device 110 may execute the executable code in trusted execution environment 120, 121 as one or more application processes and the executable code in the trusted execution environment 120, 121 may be accessible to the one or more application processes and inaccessible to a kernel managing the one or more application processes. As such, trusted execution environment 120, 121 of computing device 110B may host one or more application processes that execute the executable data and the data in the trusted execution environment may be accessible to the one or more application processes and be inaccessible to a kernel managing the one or more application processes. In either example, the data in the trusted execution environment 120, 121 may be guarded by storing the data 122 in a trusted storage area 213.

Trusted storage area 213 may be an area of one or more storage devices 212 that stores data of a computing process. Trusted storage area 213 may be a part of trusted execution environment 120, 121 and may store data 122 of computing process 225A in an encrypted form. Data 122 may be encrypted and decrypted by hardware devices using cryptographic input that includes one or more cryptographic keys. In one example, the cryptographic keys may be accessible to the hardware devices (e.g., processor 214) and may be inaccessible to operating system level processes executed by the hardware device. In another example, the cryptographic keys may be accessible to hardware devices and one or more computing processes, such as, the computing process associated with the trusted execution environment. In either example, the encryption and decryption performed by the hardware device may be referred to as hardware based encryption, hardware level encryption, hardware assisted encryption, hardware enforced encryption, process transparent encryption, other term, or a combination thereof and may use cryptographic key data (e.g., encryption and decryption keys) that are accessible to the processor and are inaccessible to all processes executed external to the trusted execution environment 120.

Trusted storage area 213 may include a portion of memory and may be referred to as an encrypted memory area. An encrypted memory area may be a contiguous or non-contiguous portion of virtual memory, logical memory, physical memory, other storage abstraction, or a combination thereof. The encrypted memory area may correspond to or be mapped to a portion of primary memory (e.g., main memory), auxiliary memory (e.g., solid state storage), adapter memory (e.g., memory of graphics card, or network interface cart), other persistent or non-persistent storage, or a combination thereof. In one example, the encrypted memory area may be a portion of main memory associated with a particular process and the processor may encrypt the data when storing the data in the memory area and may decrypt the data when retrieving the data from the memory area. The data in the memory area may be transformed (e.g., encrypted or decrypted) before, during, or after it is stored in or retrieved from the memory area and may remain in an encrypted form while in the encrypted memory area.

Trusted storage area 213 may store the data in one or more storage units. The storage units may be logical or physical units of data storage for managing the data (e.g., storing, organizing, or accessing the data). A storage unit may include a contiguous or non-contiguous sequence of bytes or bits. In one example, a storage unit may be a virtual representation of underlying physical storage units, which may be referred to as physical storage blocks. Storage units may have a unit size that is the same or different from a physical block size provided by an underlying hardware resource. The storage unit may include volatile or non-volatile data storage. In one example, storage units may be a memory segment and each memory segment may correspond to an individual memory page, multiple memory pages, or a portion of a memory page. In other examples, each of the storage units may correspond to a portion (e.g., block, sector) of a mass storage device (e.g., hard disk storage, solid state storage). The data in the storage units of trusted storage area 213 may be transmitted to other hardware devices using trusted IO 215.

Trusted IO 215 may enable the data of a computing process to be transmitted between hardware devices in a security enhanced manner. The data may be transmitted over one or more system buses, networks, or other communication channel in an encrypted or partially encrypted form. This may be advantageous because transmitting the data in an encrypted form may limit the ability of the data to be snooped while being transmitted between hardware devices. As shown in FIG. 2, trusted IO 215 may enable the data of computing process 225A to be transmitted between trusted storage area 213 and trusted processor area 217.

Trusted processor area 217 may be a portion of processor 214 that is associated with computing process 225A and guards data of computing process 225 from being accessed or modified by computing processes 225B. Trusted processor area 217 may include a portion of processor 214 that stores the data (e.g., CPU cache, processor memory or registers) and a portion of processor 214 that executes the data (e.g., processor core). Trusted processor area 217 may store the data in an encrypted form or in a decrypted form when it is present on the processor and in either example, the data of the computing process may be protected from being accessed or modified by other processes via the design of the processor and encryption may not be required to ensure isolation of the data when the data is within the processor packaging (e.g., chip packaging).

Computing device 110B may use the same processor and storage device to establish multiple instances of trusted execution environment 120. Each instance of a trusted execution environment (e.g., TEE instance, TEEi) may be established for a particular set of one or more computing processes and may be associated with a particular memory encrypted area. The instances of a trusted execution environment may be provided by the same hardware (e.g., processor and memory) but each instance may be associated with a different memory encrypted area and a different set of one or more processes (e.g., set including an individual process or set of all processes of a VM). Each instance may guard all data of a computing process or a portion of the data of a computing process. For example, computing process 225A (e.g., application or VM) may be associated with both a trusted execution environment and an untrusted execution environment. In this situation, a first portion of the data of computing process 225A may be stored and/or executed within trusted execution environment 120 and a second portion of the data of computing process 225A may be stored and/or executed within an untrusted execution environment. The second portion may be stored in the same storage device as the first portion but the second portion may be stored in a decrypted form and may be executed by processor 214 in a manner that enables another process (e.g., multiple higher privileged processes) to access or modify the data. In either example, trusted execution environment may be used to execute one or more of the computing processes 225A-B.

Each of the computing processes 225A-B may include one or more streams of execution for executing programmed instructions. A stream of instructions may include a sequence of instructions that can be executed by one or more processors. Each of the computing processes may be managed by an operating system 220 or may part of an operating system (e.g., kernel, not shown). In one example, a computing process may be an instance of a computer program that is being executed and may contain program code (e.g., executable code, executable data) and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Computing processes 225A-B may correspond to one or more applications, containers, virtual machines, secure enclaves, or a combination thereof. Applications may be programs executing with user space privileges and may be referred to as application processes, system processes, services, background processes, or user space processes. A user space process (e.g., user mode process, user privilege process) may have lower level privileges that provide the user space process access to a user space portion of data storage without having access to a kernel space portion of data storage. In contrast, a kernel process may have higher privileges that provide the kernel process access to a kernel space portion and to user space portions that are not guarded by a trusted execution environment. In one example, the privilege associated with a user space process may change during execution and a computing process executing in user space (e.g., user mode, user land) may be granted enhanced privileges by an operating system and function in kernel space (e.g., kernel mode, kernel land). This may enable a user space process to perform an operation with enhanced privileges. In another example, the privilege associated with a user space process may remain constant during execution and the user space process may request an operation be performed by another computing process that has enhanced privileges (e.g., operating in kernel space).

The privilege levels of a computing process may be the same or similar to protection levels of processor 214 (e.g., processor protection rings) and may indicate an access level of a computing process to hardware resources (e.g., virtual or physical resources). There may be multiple different privilege levels assigned to the computing process. In one example, the privilege levels may correspond generally to either a user space privilege level or a kernel privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications.

Operating system 220 may include one or more programs that are run to manage one or more of the computing processes 225A-B. Operating system 220 may include a kernel that execute as one or more kernel processes and may manage access to physical or virtual resources provided by hardware devices. A kernel process may be an example of a computing process associated with a higher privilege level (e.g., hypervisor privilege, kernel privilege, kernel mode, kernel space, protection ring 0). In one example, operating system 220 may be a host operating system, guest operating system, or a portion thereof and the computing processes 225A-C may be different applications that are executing as user space processes. In another example, operating system 220 may be a hypervisor that provides hardware virtualization features and the computing processes 225A-B may be different virtual machines. In yet another examples, operating system may include a container runtime (e.g., Docker, Container Linux) that provides operating system level virtualization and the computing processes 225A-B may be different containers. In further examples, operating system 220 may provide a combination thereof (e.g., hardware virtualization and operating system level virtualization).

The kernel of operating system 220 may segregate storage devices 212 (e.g., main memory, hard disk) into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with both diminished privileges (e.g., user space mode, user space privilege) and those with enhanced privileges. In one example, the portion of storage devices 212 associated with the enhanced privileges may be designated as kernel space and the portion of storage devices 212 associated with the diminished privileges may be designated as user space. In other examples, there may be more or less than two portions.

When the kernel provides features of a hypervisor it may also be known as a virtual machine monitor (VMM) and may provide virtual machines with access to one or more features of the underlying hardware devices. A hypervisor may run directly on the hardware of computing device 110B (e.g., host machine) or may run on or within a host operating system (not shown). The hypervisor may manage system resources, including access to hardware devices. The hypervisor may be implemented as executable code and may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc.

Figure 3:
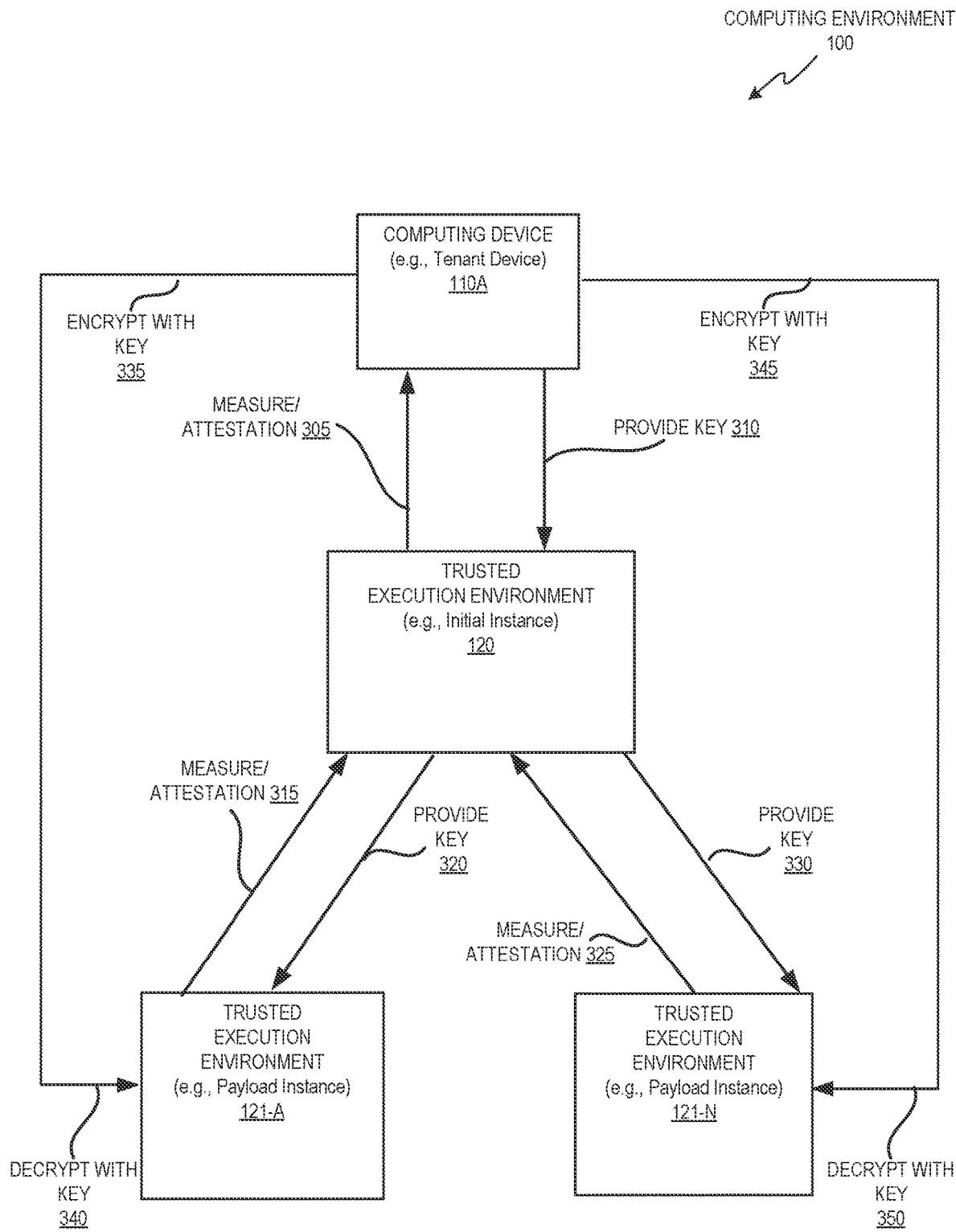
FIG. 3 depicts an illustration of facilitating efficient launching of trusted execution environments, in accordance with one or more aspects of the present disclosure.

FIG. 3 depicts an illustration of facilitating efficient launching of trusted execution environments. As shown in FIG. 3, a tenant computing device 110A can send a request to a trusted execution establishment component (e.g., trusted execution establishment component 112 in FIG. 1) of an untrusted host computing device (e.g., computing device 110B in FIG. 1) to launch a set of TEEs. As described above, the trusted execution establishment component can first establish an initial instance TEE 120. TEE 120 can subsequently act as an agent for tenant computing device 110A to establish additional payload instance TEEs 121A-N.

The trusted execution establishment component can perform authentication of TEE 120 (e.g., measurement and attestation operations) in direct communication with the tenant computing device 110A. In such instances measurement/attestation 305 can be performed to verify the integrity of the untrusted computing device which will host TEE 120 (e.g., host computing device 110B of FIG. 1). Measurement/Attestation 305 can enable a program to check the capabilities of computing device 110B and to detect unauthorized changes to programs, hardware devices, other portions of computing device, or a combination thereof. The unauthorized changes may be the result of malicious, defective, or accidental actions by a program or hardware device. The attestation may involve performing local attestation, remote attestation, or a combination thereof. Local attestation may involve enabling a program executed locally on computing device 110B to verify the integrity of the computing device 110B. Remote attestation may involve enabling a program executed remotely on a different computing device (e.g., 110A) to verify the integrity of computing device 110B. The remote attestation may be performed non-anonymously by disclosing data that uniquely identifies computing device 110B or anonymously without uniquely identifying computing device 110B (e.g., Direct Anonymous Attestation (DAA)). In either example, one or more attestation operations may be performed to determine attestation data and may transmit attestation data to the programs executing on the local or remote computing devices for verification.

Attestation data may be based on the configuration of computing device 110B and may represent the capabilities of the hardware platform, trusted execution environment, executable code, or a combination thereof. Attestation data obtained or generated by the hardware platform (e.g., processor, memory, firmware, BIOS) and be the same or similar to integrity data (e.g., hash or signature of executable code), identification data (e.g., processor model or instance), cryptographic data (e.g., signature keys, endorsement keys, session keys, encryption or decryption keys, authentication keys), measurement data, report data, configuration data, settings data, other data, or a combination thereof. In one example, determining the attestation data may involve attestation chaining in which attestation data of different portions of computing device 110B may be combined before, during, or after being obtained. This may involve determining attestation data for one or more layers of the computing device 110B and the layers may correspond to hardware device layer (e.g., hardware platform attestation data), program layer (e.g., code attestation data), other layer, or a combination thereof.

The program that receives the attestation data may use the attestation data to verify the capabilities of computing device 110B. The program may execute a verification function to verify the computing device 110B in view of the attestation data. The verification function may take as input the attestation data and provide output that indicates whether the computing device 110B is verified (e.g., trusted). In one example, the attestation data may include integrity data (e.g., a message authentication code (MAC)) and the verification function may analyze a portion of attestation data to generate validation data. The verification function may then compare the received integrity data with the generated validation data to perform the attestation (e.g., compare received MAC with generate MAC).

Once measurement/attestation 305 has completed, tenant computing device 110A can provide the executable code to be loaded into TEE 120 as well as provide the cryptographic key data (e.g., provide key 310) to be used by the payload TEEs to establish secure communication. Subsequently, TEE 120 can act as agent of tenant computing device 110A to establish the payload instance TEEs 121A-N. The operations performed by tenant computing device 110A to establish TEE 120 can thus be performed by TEE 120 to establish payload instance TEEs 121A-N.

As shown in FIG. 3, the initial instance of TEE 120 can perform the authentication (e.g., measurement/attestation 315) of TEE 121-A, and subsequently provide the cryptographic key data (e.g., provide key 320) to TEE 121-A. The executable code provided to TEE 121-A can establish secure communication with the tenant computing device 110A. In an illustrative example, tenant computing device 110A can encrypt data (depicted as "encrypt with key 335") and provide the encrypted data directly to TEE 121-A. TEE 121-A can subsequently utilize the stored cryptographic key data received from TEE 120 (which was provided to TEE 120 by the tenant) to decrypt the encrypted data (depicted as "decrypt with key 340"). Additionally, data can be encrypted by TEE 121-A and provided to the tenant computing device 110A, which can decrypt the data using the corresponding decryption key.

Similarly, TEE 120 can perform the authentication (e.g., measurement/attestation 325) of TEE 121-N, and subsequently provide the cryptographic key data (e.g., provide key 330) to TEE 121-N. The executable code provided to TEE 121-N can establish secure communication with the tenant computing device 110A. In an illustrative example, tenant computing device 110A can encrypt data (depicted as "encrypt with key 345") and provide the encrypted data directly to TEE 121-N. TEE 121-N can subsequently utilize the stored cryptographic key data received from TEE 120 (which was provided to TEE 120 by the tenant) to decrypt the encrypted data (depicted as "decrypt with key 350"). Additionally, data can be encrypted by TEE 121-N and provided to the tenant computing device 110A, which can decrypt the data using the corresponding decryption key.

In some implementations, the initial instance of TEE 120 can provide the cryptographic key data (e.g., provide key 320) to any of the additional payload instances of TEEs 121A-N. Each of the additional payload instance TEEs (e.g., TEE 121-A) can use the provided cryptographic key data to decrypt the executable code provided to the additional payload instance TEE without establishing communication between the additional payload instance TEE and the tenant computing device 110A. Further details are described with respect to FIG. 4.

Figure 4:
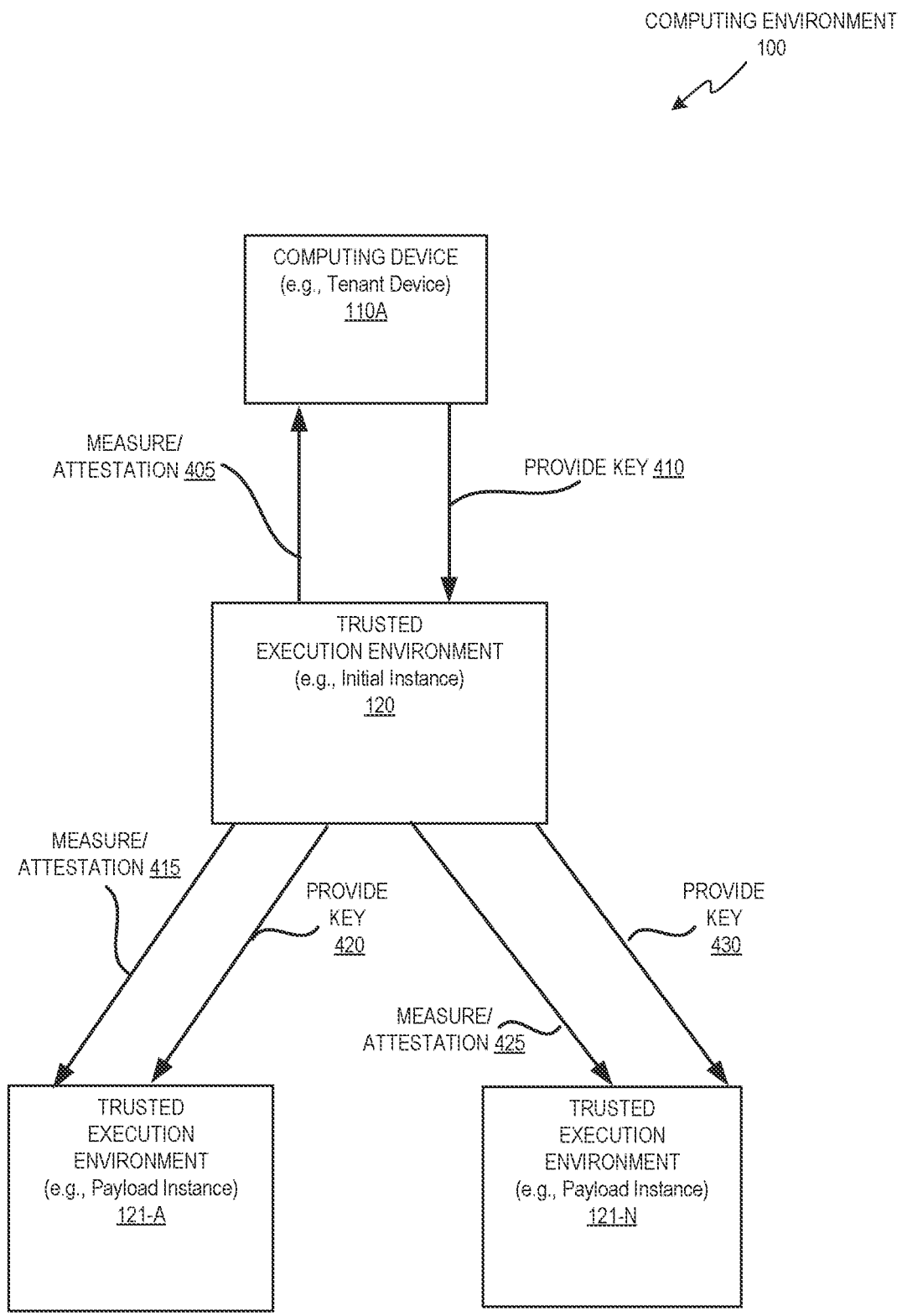
FIG. 4 depicts an illustration of facilitating efficient launching of trusted execution environments, in accordance with one or more aspects of the present disclosure.

FIG. 4 depicts an illustration of facilitating efficient launching of trusted execution environments. As shown in FIG. 4, a tenant computing device 110A can send a request to a trusted execution establishment component (e.g., trusted execution establishment component 112 in FIG. 1) of an untrusted host computing device (e.g., computing device 110B in FIG. 1) to launch an initial instance TEE of a set of TEEs. As described above, the trusted execution establishment component can first establish an initial instance of TEE 120. TEE 120 can subsequently act as an agent for tenant computing device 110A to establish additional payload instance TEEs 121A-N in response to a request to establish the additional payload instance TEEs 121A-N.

The trusted execution establishment component can perform authentication of TEE 120 (e.g., measurement and attestation operations) in direct communication with the tenant computing device 110A. In such instances measurement/attestation 405 can be performed to verify the integrity of the untrusted computing device which will host TEE 120 (e.g., host computing device 110B of FIG. 1). Measurement/attestation 405 can enable a program to check the capabilities of computing device 110B and to detect unauthorized changes to programs, hardware devices, other portions of computing device, or a combination thereof. The unauthorized changes may be the result of malicious, defective, or accidental actions by a program or hardware device. The attestation may involve performing local attestation, remote attestation, or a combination thereof. Local attestation may involve enabling a program executed locally on computing device 110B to verify the integrity of computing device 110B. Remote attestation may involve enabling a program executed remotely on a different computing device (e.g., 110A) to verify the integrity of computing device 110B. The remote attestation may be performed non-anonymously by disclosing data that uniquely identifies computing device 110B or anonymously without uniquely identifying computing device 110B (e.g., Direct Anonymous Attestation (DAA)). In either example, one or more attestation operations may be performed to determine attestation data and may transmit the attestation data to the programs executing on the local or remote computing devices for verification.

The attestation data may be based on the configuration of computing device 110B and may represent the capabilities of the hardware platform, trusted execution environment, executable code, or a combination thereof. The attestation data obtained or generated by the hardware platform (e.g., processor, memory, firmware, BIOS) and be the same or similar to integrity data (e.g., hash or signature of executable code), identification data (e.g., processor model or instance), cryptographic data (e.g., signature keys, endorsement keys, session keys, encryption or decryption keys, authentication keys), measurement data, report data, configuration data, settings data, other data, or a combination thereof. In one example, determining the attestation data may involve attestation chaining in which attestation data of different portions of computing device 110B may be combined before, during, or after being obtained. This may involve determining attestation data for one or more layers of the computing device 110B and the layers may correspond to hardware device layer (e.g., hardware platform attestation data), program layer (e.g., code attestation data), other layer, or a combination thereof.

The program that receives the attestation data may use the attestation data to verify the capabilities of computing device 110B. The program may execute a verification function to verify the computing device 110B in view of the attestation data. The verification function may take as input the attestation data and provide output that indicates whether the computing device 110B is verified (e.g., trusted). In one example, the attestation data may include integrity data (e.g., a message authentication code (MAC)) and the verification function may analyze a portion of attestation data to generate validation data. The verification function may then compare the received integrity data with the generated validation data to perform the attestation (e.g., compare received MAC with generate MAC).

Once measurement/attestation 405 has completed, tenant computing device 110A can provide the executable code to be loaded into TEE 120 as well as provide the cryptographic key data (e.g., provide key 410) to be used by the payload TEEs. Subsequently, TEE 120 can act as agent of tenant computing device 110A to establish the payload instance TEEs 121A-N. The operations performed by tenant computing device 110A to establish TEE 120 can thus be performed by TEE 120 to establish payload instance TEEs 121A-N.

As shown in FIG. 4, the initial instance TEE 120 can perform the authentication (e.g., measurement/attestation 415) of TEE 121-A, and subsequently provide the cryptographic key data (e.g., provide key 420) to TEE 121-A. The executable code provided to TEE 121-A can be decrypted using the provided cryptographic key data and then executed.

Similarly, TEE 120 can perform the authentication (e.g., measurement/attestation 425) of TEE 121-N, and subsequently provide the cryptographic key data (e.g., provide key 430) to TEE 121-N. The executable code provided to TEE 121-N can be decrypted using the provided cryptographic key data and then executed.

Figure 5:
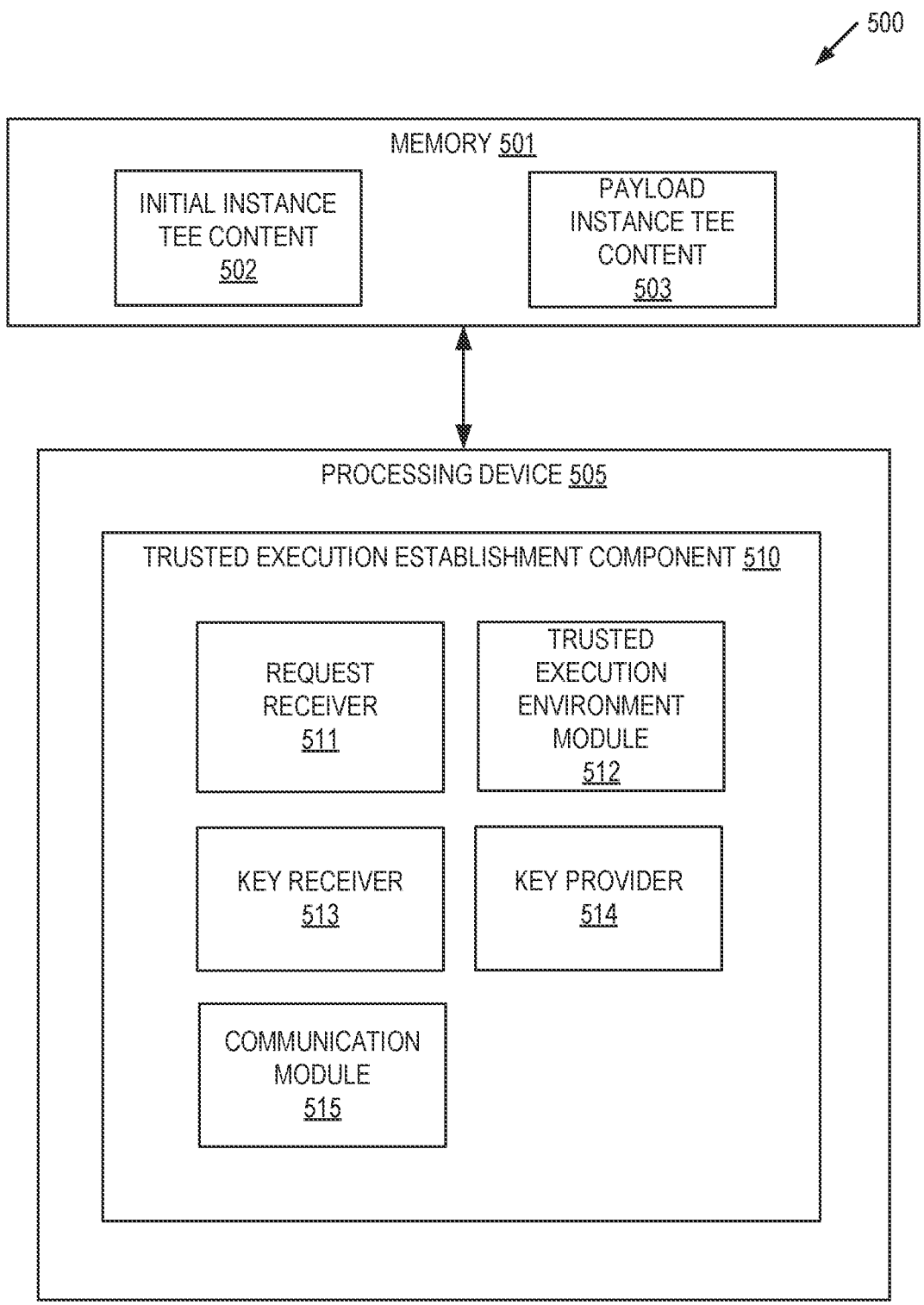
FIG. 5 depicts a block diagram illustrating an example of a trusted execution establishment component that facilitates efficient launching of trusted execution environments, in accordance with one or more aspects of the present disclosure.

FIG. 5 depicts a block diagram illustrating an example of a trusted execution establishment component 510 for facilitating efficient launching of trusted execution environments. In some implementations, trusted execution establishment component 510 may correspond to trusted execution establishment component 112 of FIG. 1. As shown in FIG. 5, trusted execution establishment component 510 may be a component of a computing apparatus 500 that includes a processing device 505, operatively coupled to a memory 501, to execute trusted execution establishment component 510. In some implementations, processing device 505 and memory 501 may correspond to processing device 802 and main memory 804 respectively as described below with respect to FIG. 8.

Trusted execution establishment component 510 may include request receiver 511, trusted execution environment module 512, key receiver 515, key provider 514, and code execution module 515. Alternatively, the functionality of one or more of request receiver 511, trusted execution environment module 512, key receiver 515, key provider 514, and communication module 515 may be combined into a single module or divided into multiple sub-modules.

Request receiver 511 is responsible for receiving a request from a tenant computing device to establish a set of trusted execution environments (TEEs) in computing apparatus 500. In some implementations, request receiver 511 is responsible for receiving a request from a tenant computing device to establish an initial instance TEE of a set of TEEs in computing apparatus 500. In various implementations, the tenant computing device can be a trusted device that communicates with computing apparatus 500 (e.g., an untrusted host device). Computing apparatus 500 can be a standalone host device, a host device that is configured within a cloud computing environment, an Internet of Things (IoT) edge device, or the like. In some implementations, request receiver 511 can receive the request from the tenant that specifies a number of TEEs to establish in computing apparatus 500. In some implementations, computing apparatus 500 can act as a manager to other untrusted host devices. In such instances, a portion of the set of TEEs can be established in computing apparatus 500, while another portion of the set can be established in other untrusted host devices. In some implementations, request receiver 511 can determine, using information included in the request, whether to establish the initial instance TEE and/or the set of TEEs within computing apparatus 500 or within any additional hosts associated with computing apparatus 500. For example, the tenant can specify in the request where to establish the requested TEE with which the tenant wishes to communicate.

Trusted execution environment module 512 is responsible for establishing the initial instance TEE (e.g., for the requested set of TEEs) in apparatus 500. As noted above, the initial instance TEE can include an encrypted memory area and executable code. In various implementations, trusted execution environment module 512 can receive the executable code from the tenant device that can subsequently be used to provision additional payload TEEs for the requested set of TEEs.

Trusted execution environment module 512 can perform measurement and attestation for the instance TEE prior to establishing any subsequent payload TEEs. In some implementations, trusted execution environment module 512 can perform these operations utilizing methods/operations that are specific to the hardware platform and/or vendor. In an illustrative example, trusted execution environment module 512 can perform measurement of the initial instance TEE by performing a hash operation over the contents of the initial instance TEE that can be subsequently signed by the applicable mechanism utilized by the platform and/or vendor.

Trusted execution environment module 512 can then perform an attestation to verify the integrity of the host apparatus 500 (e.g., integrity of the hardware platform, operating system, and/or one or more of processing devices 505). As noted above, attestation can enable a program to check the capabilities of the computing device (e.g., computing device 110 B, apparatus 500, etc.) and to detect unauthorized changes to programs, hardware devices, other portions of the computing device, or a combination thereof. The unauthorized changes may be the result of malicious, defective, or accidental actions by a program or hardware device. The attestation may involve performing local attestation, remote attestation, or a combination thereof. In either instance, one or more attestation operations can be performed to determine attestation data and may transmit the attestation data to the programs executing on the local or remote computing devices for verification.

Notably, trusted execution environment module 512 can perform the attestation without including an encryption key. Accordingly, the attestation can be performed in a platform agnostic fashion (e.g., not in a way specific to the platform and/or vendor). As described below, encryption key information can be received from the tenant and used to provision the initial instance TEE as well as any subsequently configured payload TEEs. Once attestation of the initial instance TEE has been performed, trusted execution environment module 512 can invoke key receiver 515.

Key receiver 515 is responsible for receiving cryptographic key data from the tenant computing device. In some implementations, key receiver 515 can be invoked by the initial instance TEE directly after the attestation operation has been performed. Alternatively, the management component of the host computing device (e.g., apparatus 500) can invoke key receiver 515, subsequently providing the cryptographic key data to the initial instance TEE after attestation. In some implementations, key receiver 515 can receive the cryptographic key data while the attestation operation is being performed.

As noted above, receiving the cryptographic key information from the tenant device can facilitate the subsequently created payload TEE instances to decrypt secrets by the tenant and/or by using the cryptographic key information without relying on the specific hardware technologies or vendor capabilities of the host apparatus 500. In some implementations, networking capabilities can be leveraged to secure protected content rather than any hardware specific capabilities. For example, the tenant can utilize public key encryption functionality to protect content and establish secure communication channels between the tenant device and any payload TEE instances. As noted above, this can provide the ability to exchange information between the tenant and the payload TEE instances so they are not reliant on any host specific method of attestation.

Subsequently, trusted execution environment module 512 can be invoked to establish additional payload TEEs for the tenant. In some implementations, trusted execution environment module 512 can be invoked to establish additional payload TEEs for the tenant in response to requests to establish the additional payload TEEs Each payload TEE can include a copy of the executable code provided by the tenant to the initial instance TEE or a different executable code than the executable code provided to the initial instance TEE. In various implementations, the initial instance TEE can invoke trusted execution environment module 512 to establish the payload TEEs on behalf of the tenant. In such instances, the initial instance TEE can act as a management agent component to replicate the executable code for each payload TEE and/or to establish each payload TEE. Alternatively, the management component of the host computing device (e.g., apparatus 500) can invoke trusted execution environment module 512 to establish the payload TEE instances by using the initial instance TEE as a template.

In either case, trusted execution environment module 512 can perform measurement and attestation of the payload TEE instances on behalf of the tenant. For example, the initial instance TEE can perform the measurement and attestation operations described above without involving the tenant device. Accordingly, the tenant device can lose communication with the host apparatus 500 without causing termination of the provisioning of the additional payload TEE instances. Subsequently, key provider 514 can be invoked to facilitate propagation of cryptographic key information to the established payload TEE instances.

Key provider 514 is responsible for providing the cryptographic key data to the additional payload TEEs. In some implementations, the initial instance TEE can invoke key provider 514 to provide the cryptographic key data to the payload TEEs. In such instances, the initial instance TEE can act as a management agent component. Alternatively, the management component of the host computing device (e.g., apparatus 500) can perform this operation. In some implementations, key provider 514 can provide the same cryptographic key data to each payload TEE instance. In some implementations, in such instances, each payload TEE would communicate with the tenant using the same encryption/decryption key. Alternatively, key provider 514 can provide different cryptographic key data to each of the payload TEEs. In other implementations, key provider 514 can provide a pair of one-way encrypt/decrypt keys to the payload TEE instances.

Communication module 515 is responsible for causing the executable code of the additional TEEs to communicate with the tenant computing device. In some implementations, communication module 515 is responsible for causing the additional TEEs to decrypt the executable code using the cryptographic key data and execute the executable code. In various implementations, communication module 515 can be invoked by trusted execution environment module 512 to provide the executable code received from the tenant to each of the payload TEE instances, and cause the payload TEE instances to load the executable code to establish secure communication with the tenant device. In some implementations, communication module 515 can be invoked after the payload TEE instances have been provisioned with the executable code and the cryptographic key data. In such cases, communication module 515 can send a notification to each payload TEE instance to indicate that provisioning has been completed and that the payload TEE can load and execute the provisioned executable code.

Each payload TEE can then load the executable code to establish a secure communication channel with the tenant device and/or to decrypt the executable code using the cryptographic key data provided by key provider 514. In various implementations, a payload TEE can establish a communication channel with the tenant device. Alternatively, the payload TEE can monitor a particular port for encrypted data received from the tenant. Subsequently, each payload TEE can invoke the executable code to initiate an operation to decrypt the received data using the cryptographic key data. Similarly, the payload TEE can invoke the executable code to initiate an operation to encrypt data to be sent to the tenant device using the cryptographic key data.

In some implementations, trusted execution establishment component 510 can monitor the status of the additional payload TEE instances. In such implementations, the initial instance TEE can be terminated based on the status of the payload TEE instances. For example, the initial instance TEE can determine whether the requested set of payload TEE instances have been established (e.g., whether the requested payload TEEs have been successfully provisioned with the executable code and encryption key data). The initial instance TEE can make this determination based on the exact number of payload instances requested, on a number of instances that meets a minimum threshold, or the like. Responsive to determining that the requested set of payload TEE instances have been established, the initial instance TEE can be terminated.

In another example, the initial instance TEE can determine whether the requested set of payload TEE instances have terminated (e.g., whether the requested payload TEEs have completed execution). The initial instance TEE can make this determination based on the exact number of payload instances established (e.g., if all payload instances have terminated), on a number of instances that meets a minimum threshold (e.g., a threshold number of payload instances that have terminated), or the like. Responsive to determining that the requested set of payload TEE instances have terminated, the initial instance TEE can be terminated.

In some cases, the initial instance TEE can act as a management agent component to perform these operations and self-terminate when applicable. Alternatively, the management component of the host computing device (e.g., apparatus 500) can invoke a monitor component to monitor the state of the payload TEE instances and terminate the initial instance when applicable.

Figure 6:
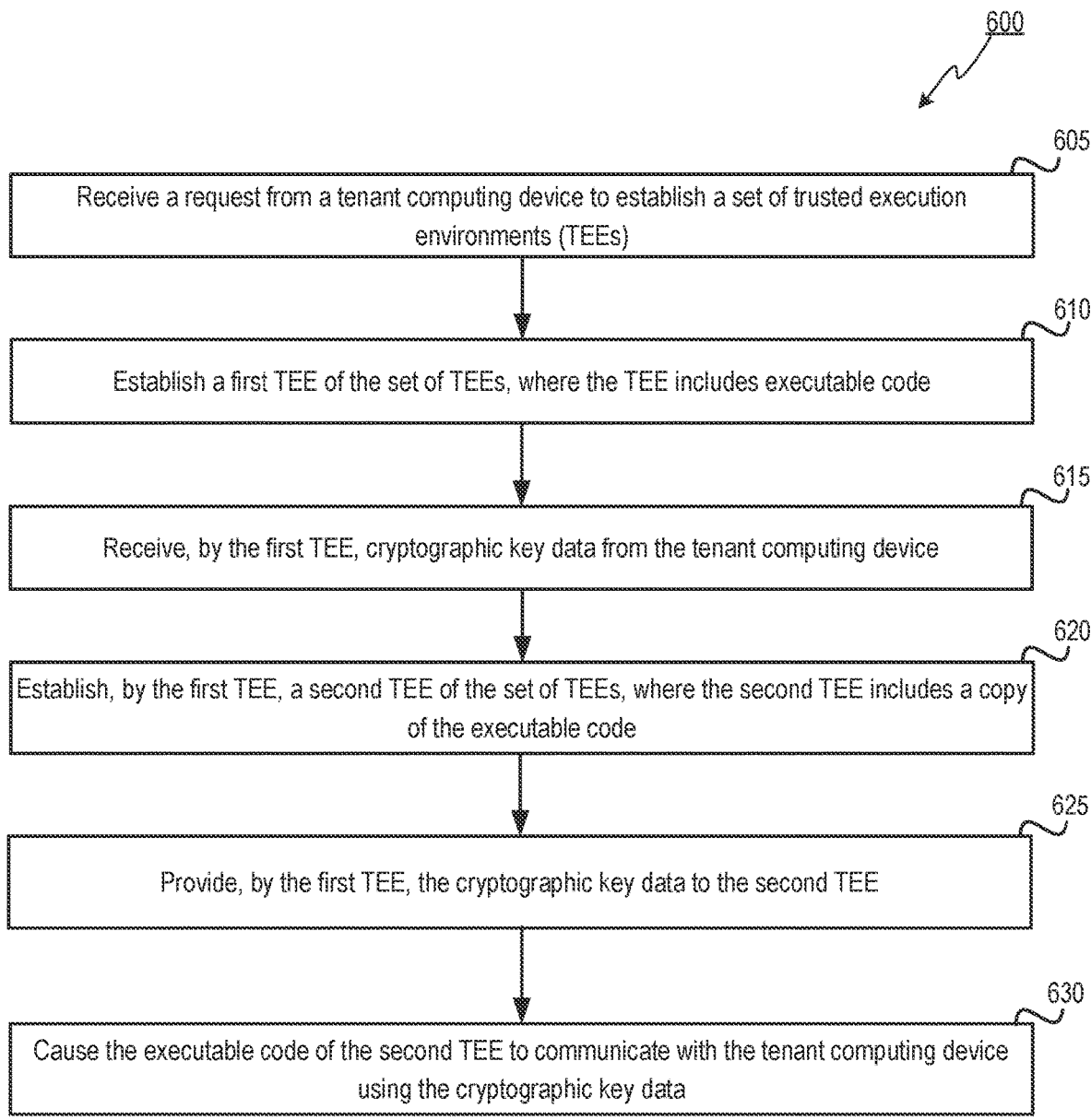
FIG. 6 depicts a flow diagram of a method for facilitating efficient launching of trusted execution environments, in accordance with one or more aspects of the present disclosure.

FIG. 6 depicts a flow diagram of an example method 600 for facilitating efficient launching of trusted execution environments. The method may be performed by processing logic that may comprise hardware (circuitry, dedicated logic, etc.), computer readable instructions (run on a general purpose computer system or a dedicated machine), or a combination of both. In an illustrative example, method 600 may be performed by trusted execution establishment component 112 in FIG. 1 or trusted execution establishment component 510 in FIG. 5. Alternatively, some or all of method 600 might be performed by another module or machine. It should be noted that blocks depicted in FIG. 6 could be performed simultaneously or in a different order than that depicted.

At block 605, processing logic receives a request from a tenant computing device to establish a set of trusted execution environments (TEEs). At block 610, processing logic establishes a first TEE of the set of TEEs, wherein the trusted execution environment comprises an encrypted memory area and executable code. At block 615, processing logic receives cryptographic key data from the tenant computing device. At block 620, processing logic establishes a second TEE of the set of TEEs, wherein the second TEE comprises a copy of the executable code. At block 625, processing logic provides the cryptographic key data to the second TEE. At block 630, processing logic causes the executable code of the second TEE to communicate with the tenant computing device using the cryptographic key data.

Figure 7:
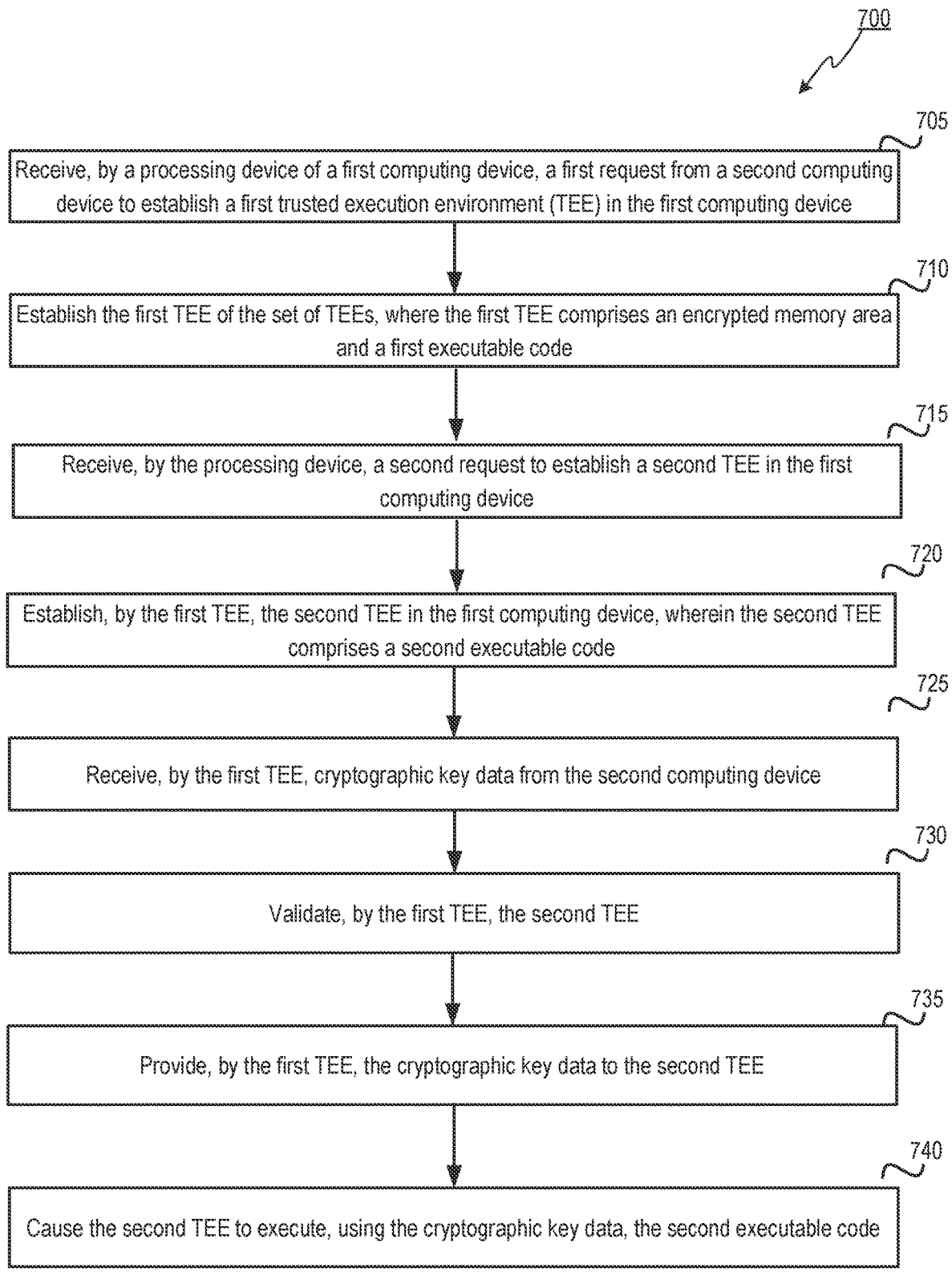
FIG. 7 depicts a flow diagram of a method for facilitating efficient launching of trusted execution environments, in accordance with one or more aspects of the present disclosure.

FIG. 7 depicts a flow diagram of an example method 700 for facilitating efficient launching of trusted execution environments. The method may be performed by processing logic that may comprise hardware (circuitry, dedicated logic, etc.), computer readable instructions (run on a general purpose computer system or a dedicated machine), or a combination of both. In an illustrative example, method 700 may be performed by trusted execution establishment component 112 in FIG. 1 or trusted execution establishment component 510 in FIG. 5. Alternatively, some or all of method 700 might be performed by another module or machine. It should be noted that blocks depicted in FIG. 7 could be performed simultaneously or in a different order than that depicted.

At block 705, the processing logic of a computing device receives a request from another (e.g., second and/or tenant) computing device to establish a first trusted execution environment (TEE). At block 710, the processing logic establishes the first TEE within the computing device, wherein the trusted execution environment includes an encrypted memory area and executable code. At block 715, processing logic receives a request to establish another (e.g., a second) TEE within the computing device. At block 720, the processing logic establishes the second TEE, where the second TEE includes another executable code (e.g., a different executable code or a copy of the executable code of the first TEE). The executable code can be specified by the request received at block 715. In some implementations, the first TEE can establish the second TEE. At block 725, the processing logic (e.g., the first TEE) receives cryptographic key data from the other (e.g., the second and/or tenant) computing device.

At block 730, the processing logic (e.g., the first TEE) validates the second TEE. In some implementations, validating the second TEE can include using authentication techniques, such as the authentication techniques described herein with respect to FIGS. 1-5). In some implementations, the first TEE can validate the second TEE using a cryptographic hash and/or a cryptographic signature of the executable code included on the second TEE. For example, if the cryptographic hash of the executable code of the executable code of the second TEE matches the cryptographic hash of the executable code specified in the request to establish the second TEE, the first TEE can validate the second TEE.

At block 735, the processing logic (e.g., by the first TEE) provides the cryptographic key data to the second TEE. At block 740, the processing logic causes the second TEE to execute the executable code using the cryptographic key data provided at block 725.

Figure 8:
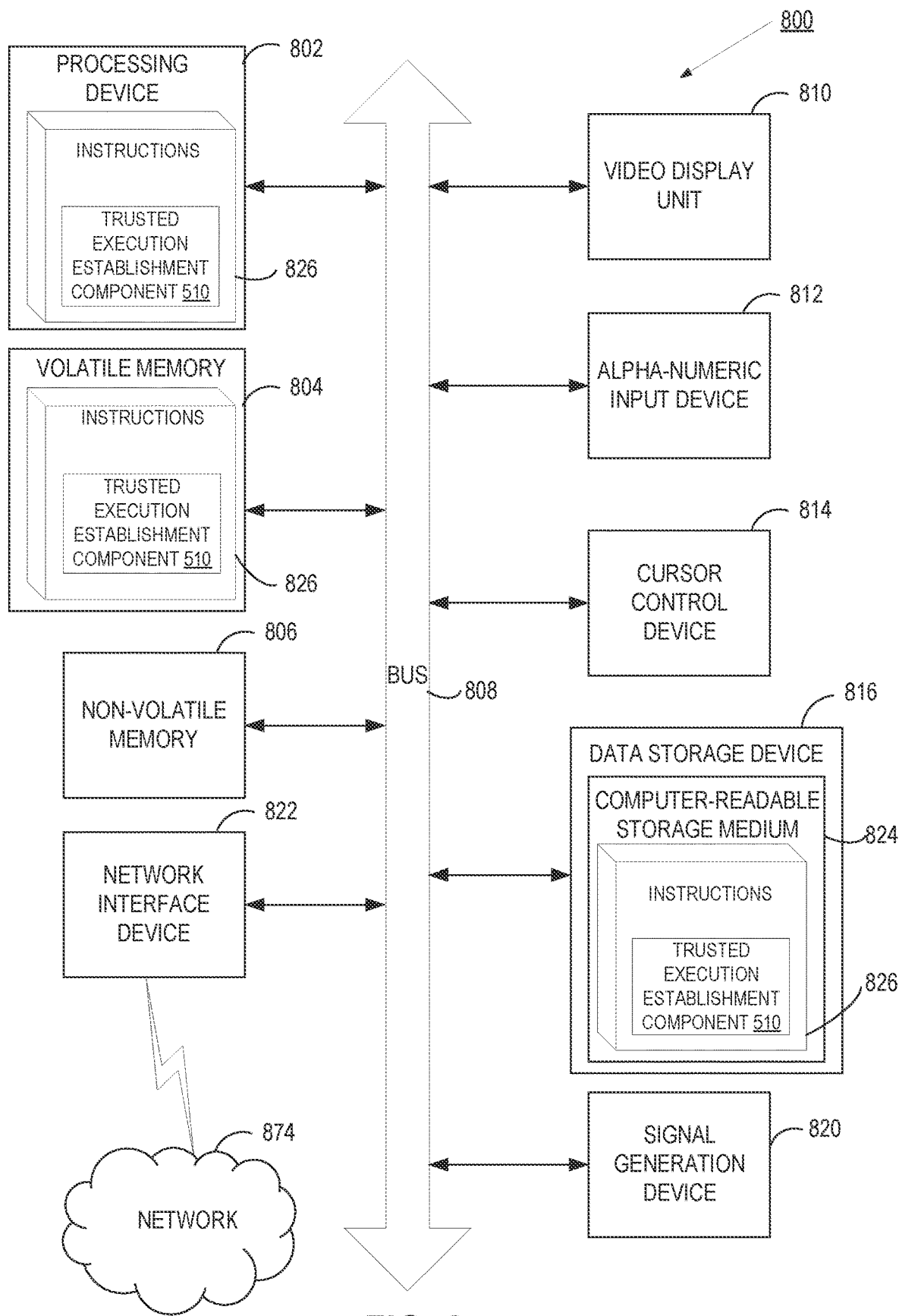
FIG. 8 depicts a block diagram of an illustrative computer system operating in accordance with one or more aspects of the present disclosure.

FIG. 8 depicts a block diagram of a computer system operating in accordance with one or more aspects of the present disclosure. In various illustrative examples, computer system 800 may correspond to computing device 110A-B of FIG. 1, and/or apparatus 500 of FIG. 5. Computer system 800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alpha-numeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 600 and 700, and for encoding components 510.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "establishing," "providing," "causing," "determining," "terminating," "encrypting," "decrypting," "performing," "executing," "configuring," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements (e.g., cardinal meaning) and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 600 and 700 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device of a first computing device, a first request from a second computing device to establish a first trusted execution environment (TEE) in the first computing device;
   establishing, by the processing device, the first TEE in the first computing device, wherein the first TEE comprises an encrypted memory area and a first executable code;
   receiving, by the processing device, a second request to establish a second TEE in the first computing device;
   establishing, by the first TEE, the second TEE in the first computing device, wherein the second TEE comprises a second executable code;
   receiving, by the first TEE, cryptographic key data from the second computing device;
   validating, by the first TEE, the second TEE;
   providing, by the first TEE, the cryptographic key data to the second TEE; and
   causing, by the processing device, the second TEE to execute, using the cryptographic key data, the second executable code.

2. The method of claim 1, further comprising:
   receiving, by the processing device, an additional request to establish one or more additional TEEs in the first computing device;
   establishing, by the first TEE, the one or more additional TEEs in the first computing device, wherein each of the one or more additional TEEs comprise an additional executable code;
   validating, by the first TEE, the one or more additional TEEs in the first computing device;
   providing, by the first TEE, the cryptographic key data to each of the one or more additional TEEs; and
   causing, by the processing device, the one or more additional TEEs to execute, using the cryptographic key data, each additional executable code.

3. The method of claim 1, further comprising:
   receiving, by the processing device, an additional request to establish one or more additional TEEs in a third computing device;
   establishing, by the first TEE, the one or more additional TEEs in a third computing device, wherein each of the one or more additional TEEs comprise an additional executable code;
   validating, by the first TEE, the one or more additional TEEs in the third computing device;
   providing, by the first TEE, the cryptographic key data to each of the one or more additional TEEs; and
   causing, by the processing device, the one or more additional TEEs to execute, using the cryptographic key data, each additional executable code.

4. The method of claim 1, wherein the second TEE comprises at least one of an encrypted virtual machine, an encrypted container, or a secure enclave component.

5. The method of claim 1, wherein receiving the cryptographic key data from the second computing device comprises:
   receiving, by the first TEE, the cryptographic key data from an intermediary processing device, wherein the intermediary processing device received the cryptographic key data from the second computing device.

6. The method of claim 1, further comprising:
   determining whether the second TEE requested by the second computing device has been terminated by the second computing device; and
   responsive to determining that the second TEE has been terminated, terminating the first TEE.

7. The method of claim 1, wherein the cryptographic key data provided by the first TEE is used by the second TEE to decrypt an encrypted data from the first computing device.

8. A system comprising:
   a memory; and
   a processing device of a first computing device operatively coupled to the memory, the processing device to:
   receive a first request from a second computing device to establish a first trusted execution environment (TEE) in the first computing device;
   establish, by the processing device, the first TEE in the first computing device, wherein the first TEE comprises an encrypted memory area and a first executable code;
   receive, by the processing device, a second request to establish a second TEE in the first computing device;
   establish, by the first TEE, the second TEE in the first computing device, wherein the second TEE comprises a second executable code;
   receive, by the first TEE, cryptographic key data from the second computing device;

validate, by the first TEE, the second TEE;
provide, by the first TEE, the cryptographic key data to the second TEE; and
cause, by the processing device, the second TEE to execute, using the cryptographic key data, the second executable code.

9. The system of claim 8, wherein the processing device is further to:
receive an additional request to establish one or more additional TEEs in the first computing device;
establish, by the first TEE, the one or more additional TEEs in the first computing device, wherein each of the one or more additional TEEs comprise an additional executable code;
validate, by the first TEE, the one or more additional TEEs in the first computing device;
provide, by the first TEE, the cryptographic key data to each of the one or more additional TEEs; and
cause, by the processing device, the one or more additional TEEs to execute, using the cryptographic key data, each additional executable code.

10. The system of claim 8, wherein the processing device is further to:
receive an additional request to establish one or more additional TEEs in a third computing device;
establish, by the first TEE, the one or more additional TEEs in a third computing device, wherein each of the one or more additional TEEs comprise an additional executable code;
validate, by the first TEE, the one or more additional TEEs in the third computing device;
provide, by the first TEE, the cryptographic key data to each of the one or more additional TEEs; and
cause, by the processing device, the one or more additional TEEs to execute, using the cryptographic key data, each additional executable code.

11. The system of claim 8, wherein the second TEE comprises at least one of an encrypted virtual machine, an encrypted container, or a secure enclave component.

12. The system of claim 8, wherein to receive the cryptographic key data from the second computing device, the processing device is further to:
receive, by the first TEE, the cryptographic key data from an intermediary processing device, wherein the intermediary processing device received the cryptographic key data from the second computing device.

13. The system of claim 8, wherein the processing device is further to:
determine whether the second TEE requested by the second computing device has been terminated by the second computing device; and
responsive to determining that the second TEE has been terminated, terminate the first TEE.

14. The system of claim 8, wherein the cryptographic key data provided by the first TEE is used by the second TEE to decrypt an encrypted data from the first computing device.

15. A non-transitory computer readable medium storing instructions which, when executed by a processing device of a first computing device, cause the processing device to:
receive a first request from a second computing device to establish a first trusted execution environment (TEE) in the first computing device;
establish, by the processing device, the first TEE in the first computing device, wherein the first TEE comprises an encrypted memory area and a first executable code;
receive, by the processing device, a second request to establish a second TEE in the first computing device;
establish, by the first TEE, the second TEE in the first computing device, wherein the second TEE comprises a second executable code;
receive, by the first TEE, cryptographic key data from the second computing device;
validate, by the first TEE, the second TEE;
provide, by the first TEE, the cryptographic key data to the second TEE; and
cause, by the processing device, the second TEE to execute, using the cryptographic key data, the second executable code.

16. The non-transitory computer readable medium of claim 15, wherein the processing device is further to:
receive an additional request to establish one or more additional TEEs in the first computing device;
establish, by the first TEE, the one or more additional TEEs in the first computing device, wherein each of the one or more additional TEEs comprise an additional executable code;
validate, by the first TEE, the one or more additional TEEs in the first computing device;
provide, by the first TEE, the cryptographic key data to each of the one or more additional TEEs; and
cause, by the processing device, the one or more additional TEEs to execute, using the cryptographic key data, each additional executable code.

17. The non-transitory computer readable medium of claim 15, wherein the processing device is further to:
receive an additional request to establish one or more additional TEEs in a third computing device;
establish, by the first TEE, the one or more additional TEEs in a third computing device, wherein each of the one or more additional TEEs comprise an additional executable code;
validate, by the first TEE, the one or more additional TEEs in the third computing device;
provide, by the first TEE, the cryptographic key data to each of the one or more additional TEEs; and
cause, by the processing device, the one or more additional TEEs to execute, using the cryptographic key data, each additional executable code.

18. The non-transitory computer readable medium of claim 15, wherein to receive the cryptographic key data from the first computing device, the processing device is further to:
receive, by the first TEE, the cryptographic key data from an intermediary processing device, wherein the intermediary processing device received the cryptographic key data from the second computing device.

19. The non-transitory computer readable medium of claim 15, wherein the second TEE comprises at least one of an encrypted virtual machine, an encrypted container, or a secure enclave component.

20. The non-transitory computer readable medium of claim 15, wherein the cryptographic key data provided by the first TEE is used by the second TEE to decrypt an encrypted data from the first computing device.

* * * * *